Jan. 6, 1931.  P. C. SMITH  1,787,556
ENGINE OR THE LIKE
Filed March 30, 1928
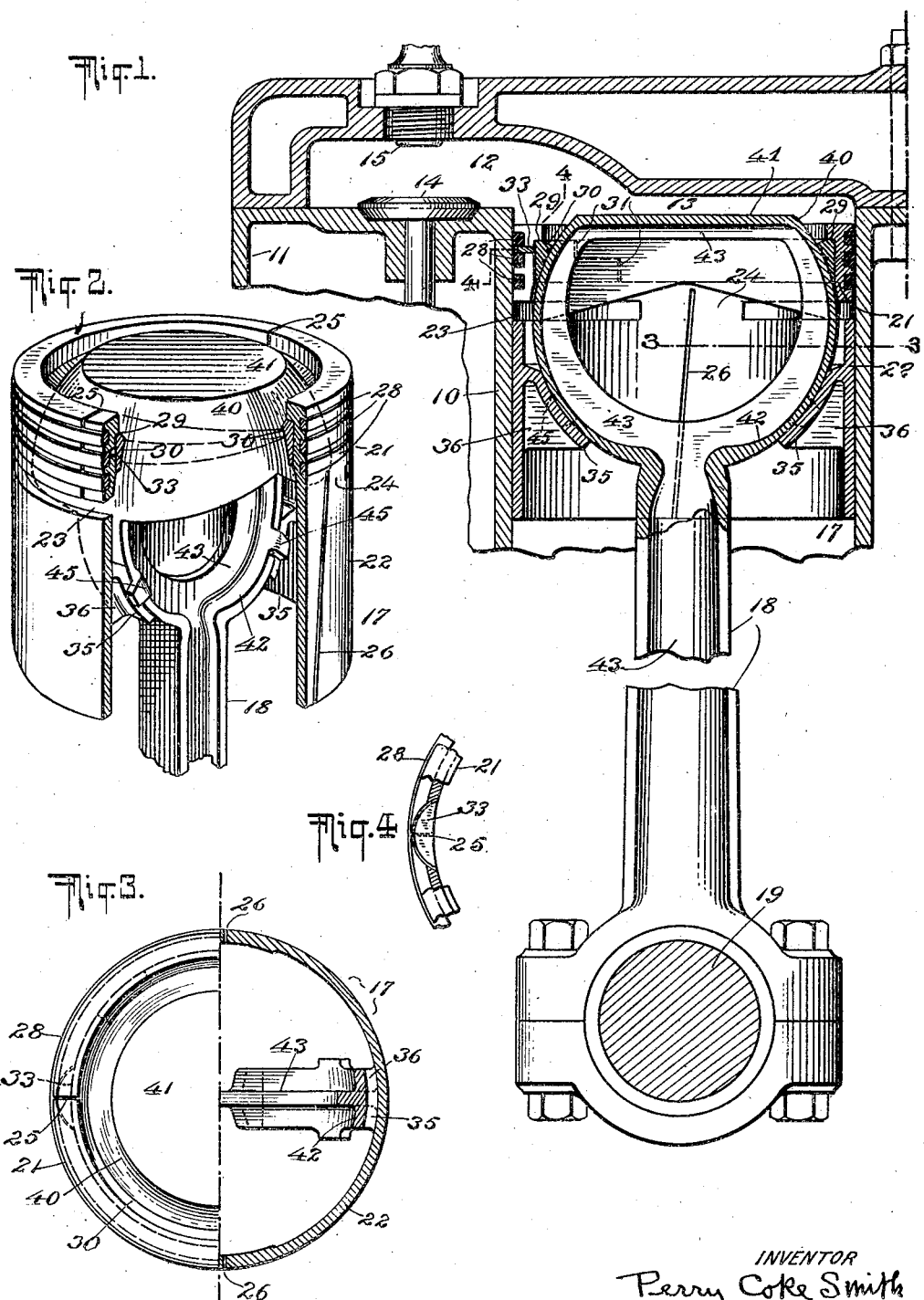
INVENTOR
Perry Coke Smith
BY Rogers, Kennedy & Campbell, ATTORNEYS.

Patented Jan. 6, 1931

1,787,556

UNITED STATES PATENT OFFICE

PERRY COKE SMITH, OF BRONXVILLE, NEW YORK

ENGINE OR THE LIKE

Application filed March 30, 1928. Serial No. 265,949.

This invention is a novel engine or the like, especially an internal combustion engine such, for example, as is used on automobiles; the invention relating more especially to the cylinder and piston of such engine, the features of novelty being embodied particularly in the construction and operation of the piston, as will be herein more fully explained.

The general objects of the invention include the improvement in the construction and operation of the piston of an engine in relation to the cylinder and to the connecting rod, in the improved cooperation between the piston and cylinder, and the improved action and interconnection between the connecting rod and piston.

A particular object is to render more uniform and unchangeable the operative relation between the piston and cylinder in the face of factors such as temperature changes and wear tending to alter or loosen the fit or clearance between the piston and cylinder. In the operation of the usual cylinder and piston there is a constant tendency to wear, which is more pronounced at what may be termed the thrust points, coming substantially at the intersection with the cylindrical surface of a central plane standing at right angles to the crank shaft; and it is an object of the present invention to compensate more especially for such wear, thus improving the action and life of the engine. A further object is to afford a piston having the property of expansibility, or resilience of circumference, thus serving the purpose of allowing for heat expansion of the metal without binding, as well as the purpose of expansibility to a minute degree to take up undue clearance resulting from wear; and to provide for the automatic bodily expansion of the piston to compensate for wear.

Another object of the invention is to afford a construction of piston in which the operative forces are so applied as to minimize the objectionable results due to the pull and thrust of the piston rod. A further object is to improve the relation between piston and piston rod by an arrangement substantially eliminating the difficulties of wear between them. A further object is to afford a construction of engine wherein the lubrication between the cylinder, piston and piston rod is improved and simplified. Other objects and advantages of the invention will be made clear in the hereinafter following description of an illustrative embodiment thereof or will be apparent to those conversant with the subject matter.

To the attainment of such objects and advantages the present invention consists in the novel engine or the like, including piston, cylinder and connecting rod, and the novel features of operation, combination, arrangement, construction and detail herein illustrated or described.

In the accompanying drawings Fig. 1 is a general central cross section of sufficient of an engine to explain the present invention, with certain portions shown in elevation. In the description hereof we shall assume an engine in which the crank shaft is beneath the piston and cylinder, but in using the terms up, down, vertical, and the like, we are doing so only in a relative sense since manifestly the parts may be turned to various positions.

Fig. 2 is a perspective view, partly broken away, of the piston and connecting rod detached from the remainder of the engine.

Fig. 3 is a combined view, the left side being a top plan view of the detached piston, while the right side is a transverse or horizontal section of the piston taken on the line 3—3 of Fig. 1.

Fig. 4 is a horizontal section taken on the line 4—4 of Fig. 1.

The engine cylinder comprises the cylindrical wall 10, and spaced therefrom outer walls 11 affording water jackets, and these are shown to enclose a combustion chamber 12 of one well known type, although any other form can be employed; and the clearance at the end of the piston may be substantially as indicated at 13. The four cycle engine may be assumed, and valves 14 are indicated for the admission and discharge from the combustion space, as well as an igniting device or spark plug 15 for causing explosions of gas mixture. The piston, indicated generally at 17, is shown connected by a rod 18 with the usual crank shaft 19. These general arrangements are illustrative of one type of engine in which the present invention may be used, the essential features of which, as described below, being applicable in various other ways to advantage.

The piston 17, or rather the sleeve portion thereof, which runs in contact with the cylinder, is shown of a construction giving resilient expansibility or yield. Thus the sleeve is shown divided into an upper section or band 21 and a lower section or skirt 22 by means of horizontal slots formed at 23, with vertical metal 24 between the slots and connecting the two sections, and divided circumferentially by vertical or longitudinal slots 25 through the upper section 21 and longitudinal slots 26 through the lower section 22. Preferably these features are in duplicate and arranged symmetrically with respect to the plane of oscillation or thrust of the connecting rod. Thus the upper vertical slots 25 are opposite to each other and adjacent to the thrust points, while the uniting portions of metal 24 are opposite to each other but spaced 90° from the slots 25, and the lower slots 26 may be extended into the metal portions 24 and downwardly to the lower edge of the skirt 22. In this way the parts of the piston may be integral or unitarily united, while the sleeve as a whole and at each part is circumferentially expansible; and the several longitudinal slots may be of appreciable width to permit relative circumferential contraction so that the piston sleeve may yield and prevent binding when under tendency to expand from excess temperature.

The upper section, or what may be termed the compression band 21 of the piston sleeve, is shown formed with a series of exterior grooves to receive piston rings 28, three being shown, of the oil wiping type, circumferentially resiliently expansible into contact with the cylinder. The piston section 21 is open at the top except as it is closed by the rocking dome occupying it, as will be described. The inner side of the top edge of the piston sleeve is formed with a shoulder 29 for the purpose of positioning and confining a pressure lining or compensating ring 30. This may be arranged to bear expansibly against the outer sleeve and is shown as having an offset slit at 31; and the ring 30 has its interior surface constituted of spherical curvature to cooperate with the exterior surface contour of the dome. The upper section 21 of the piston sleeve, at each side, may be recessed at a place exterior to the pressure lining 30 and intersecting the vertical slot 25, so as to receive a key piece or baffle 33, which straddles the slot and contacts the ring 30 thus precluding downflow through the slot and loss of compression.

The lower section 22 of the piston sleeve has, preferably formed integral with the sleeve, a pair of arc shape pieces or plates 35 adapted to constitute guides or bearings for the hoop or arch extensions of the dome element to be described; each of the arc guides 35 being braced and stiffened by a web 36.

The dome or spherical head 40 which has already been referred to is structurally a portion of the upper end or head of the connecting rod 18, but functionally is substantially a portion of the piston itself. The spherical dome oscillates or rocks with the motion of the connecting rod and in doing so bears and turns against the interior surface of the pressure lining or ring 30 in the upper section of the piston sleeve. Preferably so much of the top of the dome as does not rock into contact with the pressure ring is truncated as shown at 41, this truncated top surface being substantially flat and horizontal at the extreme positions of the piston stroke. The spherical surface of the head is also preferably abbreviated at a level somewhat below the pressure ring, leaving enough of the spherical surface intact to maintain always a tight connection between the dome and ring as the former rocks, and the head is shown deeper at the thrust points, where the swing is greatest, than near the midway points.

The connection between the spherical dome or head and the connecting rod is shown as consisting of a hoop or arched extension 42 below the dome at the two sides, constituting guiding arcs extending concentric with the rocking axis of the connecting rod, namely at the two sides where the thrust and pull of the connecting rod occur. The hooped or arch extendsions 42 are preferably spherical in exterior contour and continuations of the spherical surface of the dome, and they may constitute integral extensions of the side flanges of the connecting rod 18, which is here shown as an I-beam; and the web 43 of the rod being prolonged to stiffen not only the rod but the arched hoop, the spherical dome and the truncated top wall.

Each of the hoop or arch extensions of the dome is shown provided with a pair of lugs or flanges 45 embracing the curved hoop guides 35 and maintaining the connecting rod and dome against rotary displacement.

While the dome 40 is physically a part of the connecting rod and rocks within the piston sleeve 17, it is more than a mere rocking connection between the rod and the sleeve, and indeed is effectively an important part of the piston, the dome and the sleeve together constituting the piston and receiving the pressure of the explosion. It will be noticed that the top or truncated wall 41 is at right angles to the length of the connecting rod and it therefore results that the bulk of the pressure on the dome is transmitted both directly and longitudinally to the rod, in all positions of the latter, thus eliminating a part of the objectionable side thrust usually occurring in ordinary pistons. The arrangement therefore acts quite differently from the ordinary interior wrist pin connection between rod and piston which involves knocks and thrusts, which are rapidly accentuated with the inevitable wear of the connection. With the present invention there is only minor strain and pressure between the piston sleeve and spherical head, and the arrangement may be considered as comprising a spherical piston moving in the engine cylinder, with the piston sleeve as a guide or shoe between the sphere and the cylinder.

The mode of automatic compensation or take-up for wear will now be more fully described. This operates to take up clearance or looseness as between both sections of the piston sleeve and the cylinder, also clearance due to wear between the spherical dome and the pressure ring, also the wear between the hoop extension and hoop guides. The principle of this part of the improvement is to take advantage of the formation of carbon on portions of the spherical surface to build up the dimensions or diameter thereof. It will be manifest that at each side of the spherical dome, adjacent to the usual thrust points of the piston a certain fraction of the surface of the sphere will become alternately exposed to the heat of the combustion and concealed by contact with the pressure ring, as partly indicated by dotted lines on Fig. 2. The surface portion thus alternately exposed and covered at each side may be described as a spherical segment, each of said segments having its maximum width at the thrust points and tapering to zero at the intermediate points. When the spherical segment at one side is wholly exposed that at the other side is covered, and vice versa. The result is that all parts of the areas of both spherical segments are subject to accretion or building up by the carbonization of lubricant thereon. The carbon deposit is gradually compressed and forced into the spherical surface by the rubbing contact with the pressure ring; the deposit being thereby worked in and hardened upon the working surface of the dome.

When the parts are new or well fitting the action will tend rather to scrape off and remove from the dome the carbon deposit, but as wear progresses the deposit builds up as stated, thus increasing the effective diameter of the sphere. Moreover the accretion of carbon upon the segmental areas of the sphere will be maximum in amount at the points of maximum exposure, namely adjacent the thrust points of the piston, where the tendency to wear is maximum. In a sense the carbon deposit so utilized constitutes a surface packing which is of a self adjusting character.

It will be observed that the widest part or center of each spherical segment is diametrically opposite to one of the hoop guides 35, so that the accretion of diameter of the spherical dome takes up any possible clearance between the head of the piston rod, including dome and hoop, and the contacting surfaces of the piston sleeve, namely the pressure ring and the hoop guides. An expansive pressure is produced by the layer of carbon deposit upon the sphere and this operates along both inclined diameters, that is between each side of the pressure ring and the opposite hoop guides, to produce an expansion force tending to enlarge the working diameter of the piston sleeve, at both its upper and lower sections, which is permitted by the resilient construction of the sleeve as already described. Therefore when wear appears between the piston sleeve and cylinder the described expanding or wedging action operates progressively, as the wear developes, to expand the piston diameter, especially at the thrust points of the piston, thus tending to take up any developed looseness or clearance between the piston and cylinder.

The deposit of carbon is more than ample for the purposes described and any excess carbon deposit on the spherical segments will be removed by the scraping action against the upper edge of the pressure ring. The carbon thus scraped from the spherical surface of the dome tends to accumulate in the annular recess existing between the dome and sleeve of the piston, directly above the pressure ring. This accumulation of loose carbon is not a detriment but tends to improve the sealing of the parts against loss of compression at this point. Further excess of loose carbon at this point will readily be carried out through the exhaust of the engine.

An advantageous feature of the present invention is the ability to construct the piston with a small number of parts and without the need of any bolts, studs or other fastenings in assembling them. The pressure ring 30 is readily inserted from below, turned into position, compressed slightly and forced up into contact with the shoulder 29. The connecting rod and its head, comprising the spherical dome and hoop, is also readily inserted by a combination of swinging, twisting and rocking motions. It will thus be clear from Fig. 2 that if the connecting rod be disconnected from the crank shaft it may be swung so far as to disengage the hoop lugs 45 from the hoop guides 35, thus permitting the entire rod to be twisted or rotated, after which it can be swung laterally to tilt the spherical dome far enough to pass out between the hoop guides. If in some cases this is found to be difficult the hoop guides may readily be made detachable from the skirt of the piston sleeve.

Lubrication is automatic and thorough. Oil scraped from the cylinder naturally enters the transverse slots 23, thereby reaching the spherical surface of the dome as it rocks to and fro, while portions of oil accumulating here will readily descend along the hoop portions of the head and down the surfaces of the hoop guides, these parts also receiving oil from the splash in the crank case.

An additional advantage of the present invention is the effective lengthening of the center-to-center connection between the piston and the crak shaft, and this tends to improve the smoothness of action and reduce slapping.

For some purposes the present invention may be considered in the broad aspect of its possible application, not merely to an engine converting fluid pressure into rotation, but to an inversion thereof such as a compressor; and in either aspect the invention may be described as consisting of a piston and pitman construction wherein is comprised a rocking dome, of spherical or other workable shape, constituting a head to the pitman or connecting rod, in combination with an open piston tube or sleeve slidable in its cylinder, the sleeve and the dome having a pressure tight rocking or oscillating fit, and the dome receiving directly a substantial part of the fluid pressure, while the sleeve acts as a sliding shoe working in the cylinder.

There has thus been described a novel piston and pitman construction, for engines or the like, embodying the principles and attaining the advantages of the present invention. Since many matters of operation, combination, arrangement, construction and detail may be variously modified without departing from the principles hereof it is not intended to limit the invention to such matters except so far as set forth in the appended claims.

What is claimed is:

1. In combination, a tubular piston having an upper band portion and a lower skirt portion, a connecting rod having a spherical or rocking head disposed within the piston, spherical or curved guides on the inner side of the skirt for engaging the head below the center thereof, and a slit sealing ring fitted in the band portion of the piston to engage the head above its center, whereby the head is confined between said guides and ring, and the band portion being formed with a shoulder above and confining said slit ring.

2. A piston and pitman construction comprising a rocking dome as a head to the pitman, and an open piston sleeve, the two having a pressure tight rocking fit, and said sleeve being so slitted as to render its circumference resilient at all points, namely, by opposite transverse slits nearly meeting at the two sides, vertical slits from near such meeting point to one end of the sleeve, and opposite vertical slits from the transverse slits to the other end of the sleeve.

3. A piston sleeve combined with a pitman carrying rocking means closing the sleeve, and said sleeve partially slitted transversely to form upper and lower sections and each section slitted longitudinally for its full length.

4. A piston of the class described, comprising a tubular body having separated transverse slots intermediate its ends to provide a circular band and a depending skirt, said band and skirt being longitudinally slotted in different planes to render the same independently expansible.

5. A piston of the class described, comprising a tubular body having diametrically opposed transverse slots intermediate its ends to provide a circular band and a depending skirt, said band being longitudinally slotted in the thrust plane of the piston, and the skirt being longitudinally slotted in a plane substantially perpendicular to the thrust plane.

6. A piston and pitman construction comprising a piston sleeve open from end to end, and formed, near its middle with transverse open slits extended nearly to meet, and with longitudinal slits extended from one end of the sleeve to said transverse slits, and with longitudinal slits extended through the other end of the sleeve, whereby to give resilient expansibility to the sleeve from end to end, and means closing one end of the sleeve and adapted to effect compensating expansion thereof.

7. A piston and pitman construction comprising a rocking dome as a head to the pitman, and a piston sleeve slidable in the cylinder, the dome and sleeve above the rocking center having circumferentially engaging spherical surfaces, and below the rocking center the pitman having a concentric arched hoop and the sleeve having at the thrust sides arc guides forming bearings for the sides of the arched hoop, with projecting parts confining the hoop in engagement with the guides.

8. A construction as in claim 7 and wherein the confining parts are lugs carried on the hoop and sliding along the guide or guides and adapted by excessive rocking to disengage the guide or guides and permit rotation and removal of the pitman.

9. A construction as in claim 7 and wherein the confining parts are lugs carried on the hoop and sliding along the guide or guides, one of the guides cut away to receive such lug upon abnormal rocking of the pitman and permit bodily rotation of the pitman.

10. A construction as in claim 7 and wherein the spherical surface of the sleeve is formed on a removable pressure ring confined above by a shoulder and removable below by tilting.

In testimony whereof, I have affixed my signature hereto.

PERRY COKE SMITH.